US009122098B2

(12) United States Patent
Oshima

(10) Patent No.: US 9,122,098 B2
(45) Date of Patent: Sep. 1, 2015

(54) IMAGE DISPLAY DEVICE, PHOTOGRAPHY DEVICE, IMAGE DISPLAY SYSTEM AND METHOD THAT ADJUSTS DISPLAY BACKLIGHT LUMINANCE BASED ON IMAGE TAG INFORMATION

(71) Applicant: FUJIFILM Corporation, Tokyo (JP)

(72) Inventor: Hiroyuki Oshima, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 14/491,244

(22) Filed: Sep. 19, 2014

(65) Prior Publication Data

US 2015/0002700 A1 Jan. 1, 2015

Related U.S. Application Data

(63) Continuation of application No. PCT/JP2013/054846, filed on Feb. 26, 2013.

(30) Foreign Application Priority Data

Mar. 21, 2012 (JP) .................................. 2012-064089

(51) Int. Cl.
*H04N 9/68* (2006.01)
*G02F 1/1335* (2006.01)
(Continued)

(52) U.S. Cl.
CPC .... *G02F 1/133606* (2013.01); *G02F 1/133603* (2013.01); *G09G 3/3426* (2013.01); *H04N 1/2133* (2013.01); *H04N 1/32128* (2013.01);
(Continued)

(58) Field of Classification Search
USPC ........................................................ 348/234
See application file for complete search history.

(56) References Cited

U.S. PATENT DOCUMENTS

2002/0196244 A1 12/2002 Satoh et al.
2007/0247833 A1 10/2007 Lee et al.
(Continued)

FOREIGN PATENT DOCUMENTS

JP 2003-66932 A 3/2003
JP 2007-96950 A 4/2007
(Continued)

OTHER PUBLICATIONS

International Preliminary Report on Patentability for PCT/JP2013/054846 completed on Jul. 2, 2014.
(Continued)

*Primary Examiner* — Gary C Vieaux
(74) *Attorney, Agent, or Firm* — Birch, Stewart, Kolasch & Birch, LLP

(57) ABSTRACT

An image display device includes: a transmissive display panel; a backlight unit on a back face thereof and performing backlight local dimming; a tag information analysis unit that analyzes tag information on an acquired image file; and a backlight control signal creation unit that detects luminance for each of divided image areas of an image in the image file to determine backlight luminance for each of divided light emission areas of the backlight unit in accordance with the detected luminance for each of the image areas in a case where it is determined to perform the BLD in accordance with an analysis result of the tag information on the image file acquired by the tag information analysis unit, and that controls backlight luminance so that the backlight luminance of all the image in the image file becomes uniform in a case where it is determined not to perform the BLD.

11 Claims, 11 Drawing Sheets

(51) Int. Cl.
  *H04N 5/232*  (2006.01)
  *H04N 1/32*  (2006.01)
  *G09G 3/34*  (2006.01)
  *H04N 1/21*  (2006.01)

(52) U.S. Cl.
  CPC ..... *H04N 5/23293* (2013.01); *G09G 2320/062* (2013.01); *G09G 2320/066* (2013.01); *G09G 2320/0626* (2013.01); *G09G 2360/16* (2013.01); *H04N 2201/3242* (2013.01)

(56) References Cited

U.S. PATENT DOCUMENTS

2009/0268105 A1  10/2009  Kohashikawa et al.
2010/0266160 A1*  10/2010  Yamada ........................ 382/103
2013/0235072 A1*  9/2013  Longhurst et al. ............ 345/605

FOREIGN PATENT DOCUMENTS

| JP | 2007-241251 A | 9/2007 |
| JP | 2007-279395 A | 10/2007 |
| JP | 2007-286627 A | 11/2007 |
| JP | 2007-334034 A | 12/2007 |
| JP | 2009-177226 A | 8/2009 |
| JP | 2012-32719 A | 2/2012 |

OTHER PUBLICATIONS

International Search Report for PCT/JP2013/054846 mailed on Jun. 4, 2013.

Written Opinion of the International Searching Authority for PCT/JP2013/054846 mailed on Jun. 4, 2013.

\* cited by examiner

IMAGE DISPLAY DEVICE, PHOTOGRAPHY DEVICE, IMAGE DISPLAY SYSTEM AND METHOD THAT ADJUSTS DISPLAY BACKLIGHT LUMINANCE BASED ON IMAGE TAG INFORMATION

CROSS-REFERENCE TO RELATED APPLICATIONS

This application is a Continuation of PCT International Application No. PCT/JP2013/054846 filed on Feb. 26, 2013, which claims priority under 35 U.S.C §119(a) to Japanese Patent Application No. 2012-064089 filed on Mar. 21, 2012. Each of the above applications is hereby expressly incorporated by reference, in their entirety, into the present application.

BACKGROUND OF THE INVENTION

1. Field of the Invention

The presently disclosed subject matter relates to an image display device, a photography device, an image display system and method, and particularly to a technique of controlling backlight luminance of a transmissive display panel.

2. Description of the Related Art

Japanese Patent Application Laid-Open No. 2007-286627 (PTL 1) discloses a backlight unit that irradiates a back face of a liquid crystal panel with light, and that includes an LED light source section that has a plurality of light source areas and is partially driven for each of the light source areas; partition walls arranged between each of the light source areas of the LED light source section; and a circuit section that drives the LED light source section.

Japanese Patent Application Laid-Open No. 2007-279395 (PTL 2) discloses a configuration in which a peak luminance value is calculated for each of display areas on the basis of an input image signal to control brightness of backlight for each of the display areas in accordance with the calculated peak luminance value for each of the display areas.

Japanese Patent Application Laid-Open No. 2007-096950 (PTL 3) discloses a configuration which reads out information showing a shutter speed and an aperture value at the time of photographing from a tag area of an image file conforming to Exchangeable image file format (Exif) standard, and derives brightness in photographing environment on the basis of the read-out information so that backlight is emitted at luminous intensity corresponding to the brightness in the photographing environment.

Japanese Patent Application Laid-Open No. 2007-334034 (PTL 4) discloses a configuration which detects illuminance of outside light and luminance of a display image, and controls display luminance of a display device on the basis of the detected illuminance of outside light and luminance of the display image.

SUMMARY OF THE INVENTION

Unfortunately, even if backlight local dimming (BLD) is performed on the image display device in accordance with an analysis result of an image signal or a measurement result of ambient light at the time of displaying an image, there is a problem that the image is not displayed with a contrast corresponding to photographing intent of a photographer.

In the invention described in PTL 1 and PTL 2, since only the BLD is performed on the basis of an analysis result of an image signal and a measurement result of ambient light at the time of displaying an image is performed on the image display device, the image is not displayed with a contrast corresponding to intention of photographing performed by a photographer.

In the invention described in PTL 3 and PTL 4, the BLD is not performed, so that a contrast cannot be changed in accordance with a photographing condition.

The presently disclosed subject matter is made in light of the above-mentioned circumstances, and an object of the presently disclosed subject matter is to provide an image display device, a photography device, and an image display system and method, which are capable of displaying an image with a contrast reflecting the photographing intent of a photographer.

In order to achieve the object, the presently disclosed subject matter provides an image display device that includes: an image file acquisition unit for acquiring an image file including an image created by a photography device and tag information added to the image by the photography device; a transmissive display panel for displaying the image of the image file acquired by the image file acquisition unit; a backlight unit that is provided on a back face of the transmissive display panel and is divided into a plurality of light emission areas, and that is capable of performing backlight local dimming to determine backlight luminance with respect to the transmissive display panel for each of the divided light emission areas; a tag information analysis unit for analyzing the tag information of the image file acquired by the image file acquisition unit; and a control unit that determines whether or not to perform the backlight local dimming of the backlight unit, in accordance with an analysis result of the tag information of the image file acquired by the tag information analysis unit, and that detects luminance for each of image areas divided by corresponding to the light emission area of the image of the image file to determine the backlight luminance for each of the divided light emission areas of the backlight unit in accordance with the detected luminance for each of the image areas in a case where it is determined to perform the backlight local dimming, as well as controls backlight luminance so that the backlight luminance of all the image in the image file becomes uniform in a case where it is determined not to perform the backlight local dimming.

Thus, since tag information added to an image by the photography device is analyzed to determine whether or not to perform the backlight local dimming (BLD) in accordance with an analysis result of the tag information, it becomes possible to display an image with a contrast reflecting the photographing intent of a photographer by comparing with a case where it is changed whether or not to perform the BLD in accordance with an analysis result of an image signal, acquired by an image display device.

In one embodiment, the tag information analysis unit determines if there is any control information showing whether or not to perform the backlight local dimming of the backlight unit in the tag information of an image file acquired by the image file acquisition unit, and the control unit detects luminance for each of the image areas of the image of the image file to perform the backlight local dimming in a case where there is the control information on the backlight local dimming in the tag information of the image file, as well as the control information shows that the backlight local dimming is to be performed, and controls backlight luminance so that the backlight luminance of all the image in the image file becomes uniform in a case where there is the control information on the backlight local dimming in the tag information of the image file, as well as the control information shows that the backlight local dimming is not to be performed. Thus, since whether to perform the BLD or not is changed on the image display device side, in accordance with the determination whether to perform the BLD or not made on the photography device side, it is always possible to display an image with a contrast reflecting the photographing intent of a photographer.

In one embodiment, the tag information analysis unit extracts information on a photographing mode selected by the photography device at the time of photographing the image from the tag information of the image file acquired by the image file acquisition unit, and the control unit performs control of determining whether or not to perform the backlight local dimming in accordance with the information on the photographing mode, which is extracted by the tag information analysis unit in a case where there is not the control information on the backlight local dimming in the tag information of the image file. Thus, in a case where the photography device has a function of determining whether to perform the BLD or not to write the determination into the tag information, it is always possible to display an image with a contrast reflecting the photographing intent of a photographer, and even in a case where the photography device has no function of determining whether to perform the BLD or not to write the determination into the tag information, it is possible to display an image with a contrast reflecting the photographing intent of a photographer as much as possible.

In one embodiment, the tag information analysis unit extracts information on a photographing mode selected by the photography device at the time of photographing an image from tag information of an image file, and the control unit performs control of determining whether or not to perform the backlight local dimming in accordance with the information on the photographing mode, extracted by the tag information analysis unit.

In one embodiment, the image in the image file is as a wide dynamic range image composed of a first photographed image and a second image photographed with low sensitivity or low exposure with respect to the first photographed image, as well as photographing mode information is dynamic range extension information showing a degree of dynamic range extension of the image or showing whether or not the image is the wide dynamic range image, and the control unit determines whether to perform the backlight local dimming in accordance with the dynamic range extension information. In a case where a dynamic range (DR) is set at 400% (four times higher than that of a normal range) for example, it is possible to make a well-modulated tone of an image by turning on the BLD to extend contrast that locally modulates backlight luminance. Conversely, in a case where the DR is set at 100% (normal range), it is possible to make a tone of an image prior to an original image gradation, by turning off the BLD to make backlight luminance uniform in an overall image.

In one embodiment, the photographing mode information includes a photographing scene selected by the photography device at the time of photographing or scene position information showing exposure control, and the control unit determines whether or not to perform the backlight local dimming in accordance with the scene position information. Thus, it is possible to emphasize a bright portion and a dark portion.

In one embodiment, the tag information analysis unit extracts information showing an average of backlight luminance in the whole light emission area of the backlight unit at the time of performing the backlight local dimming, from the tag information in the image file, and the control unit controls average luminance in the whole light emission area of the backlight unit in accordance with the information showing the average of backlight luminance, which is extracted by the tag information analysis unit. Thus, it is possible to reflect intention at a finer level.

In one embodiment, the control unit controls average luminance in the whole light emission area of the backlight unit in accordance with information on a photographing mode selected by the photography device at the time of photographing in a case where there is no information showing an average value of the backlight luminance in the tag information in the image file. Thus, even in a case where the photography device has no function of writing information showing the average value of backlight luminance into the tag information, it is possible to reflect intention at a finer level.

In one embodiment, the tag information analysis unit extracts information showing a degree of contrast extension at the time of performing the backlight local dimming from the tag information in the image file, and the control unit controls difference between maximum backlight luminance and minimum backlight luminance of the backlight unit in accordance with the information showing the degree of contrast extension, which is extracted from the tag information in the image file. Thus, it is possible to reflect intention at a finer level.

In one embodiment, the control unit controls difference between maximum backlight luminance and minimum backlight luminance of the backlight unit in accordance with information on a photographing mode selected by the photography device at the time of photographing in a case where there is no information showing the degree of contrast extension in the tag information in the image file. Thus, even in a case where the photography device has no function of writing information showing the degree of contrast extension into the tag information, it is possible to reflect intention at a finer level.

In addition, the presently disclosed subject matter provides an image display system including the image display device and photography device described above.

Further, the presently disclosed subject matter provides the photography device constituting the image display system described above, the photography device including: an operation unit for receiving input of a photographing instruction; a photographing unit for photographing a subject to create the image upon receiving the photographing instruction; and a recording unit that determines whether or not to perform the backlight local dimming of the backlight unit in accordance with photographing conditions at the time of photographing the subject to create the control information, and that adds the tag information including the control information to the image to record the image file including the image and the tag information on a recording medium.

According to the presently disclosed subject matter, it is possible to display an image with a contrast reflecting the photographing intent of a photographer.

DETAILED DESCRIPTION OF EXEMPLARY EMBODIMENTS

Referring to accompanying drawings, embodiments of the presently disclosed subject matter are described in detail.

[Configuration of Image Display Device]

Figure 1:
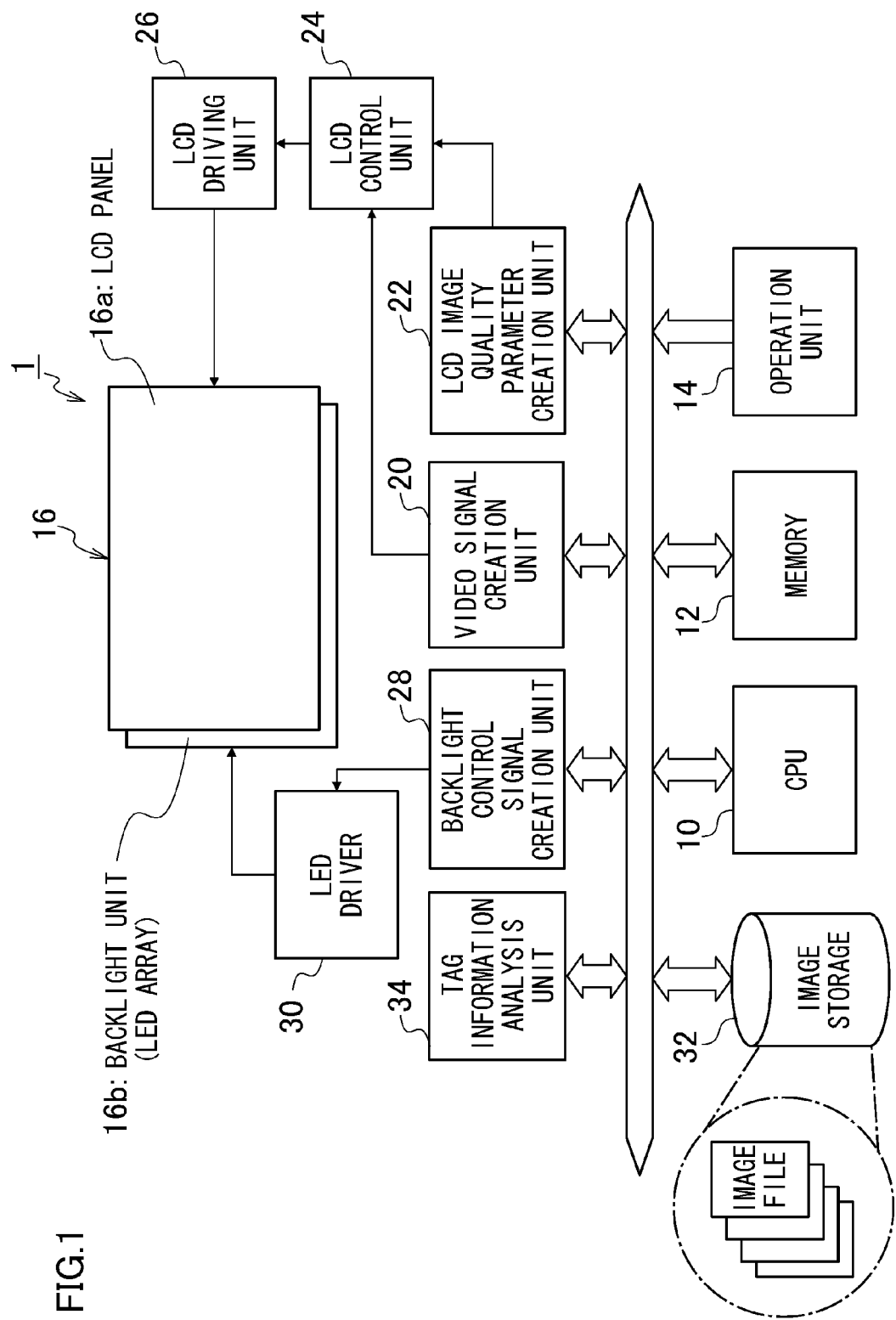
FIG. 1 is a block diagram illustrating an embodiment of an image display device in accordance with the presently disclosed subject matter.
Figure 2:
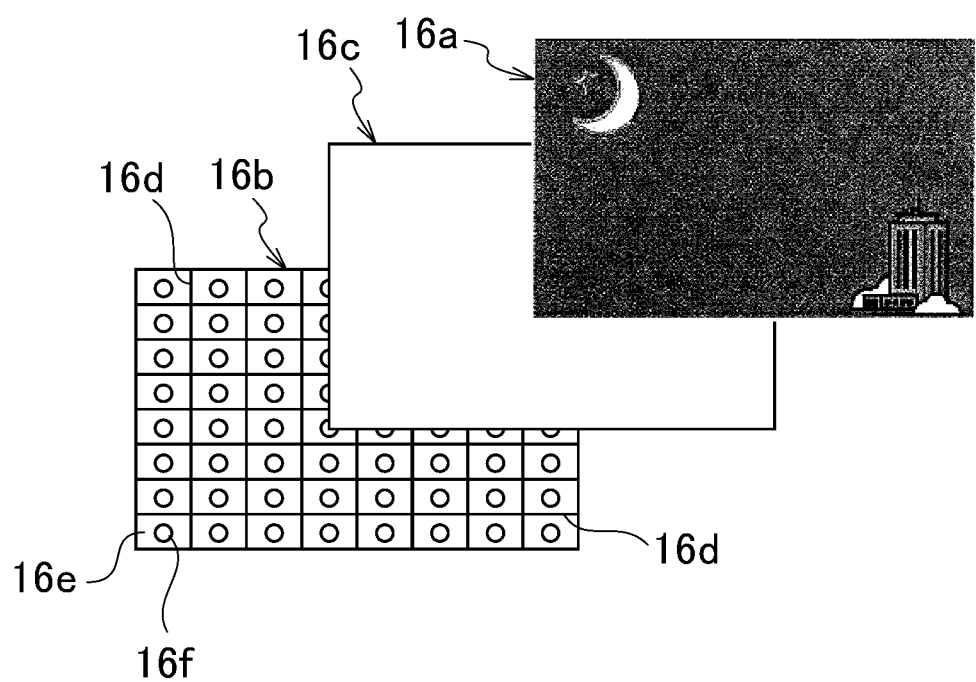
FIG. 2 is an illustration of a liquid crystal display unit illustrated in FIG. 1.

FIG. 1 is a block diagram illustrating an embodiment of the image display device in accordance with the presently disclosed subject matter, and FIG. 2 is an illustration of the liquid crystal display unit illustrated in FIG. 1.

An image display device 1 illustrated in FIG. 1 is a display including a backlight local dimming (BLD) function, and is mainly composed of: a central processing device (CPU) 10; a memory 12; an operation unit 14; a liquid crystal (LCD) display unit 16 (LCD panel 16a (transmissive display panel); a backlight unit (LED array) 16b); a video signal creation unit 20; an LCD image quality parameter creation unit 22; an LCD control unit 24; an LCD driving unit 26; a backlight control signal creation unit 28 (control unit); a light emission diode (LED) driver 30; an image storage 32; and a tag information analysis unit 34 (tag information analysis unit).

The CPU10 performs integrated control of an overall operation of the image display device 1 in accordance with input from the operation unit 14, in accordance with a predetermined control program. The CPU10 acquires an image file stored in the image storage 32 as an image file acquisition unit, as well as extends compression image data (image data to which JPEG compression is applied, for example) stored in the image file to acquire the extended image data.

The memory 12 (storage unit) includes an SDRAM serving as a volatile memory, an EEPROM serving as a nonvolatile memory which is rewritable, and the like. The SDRAM is used as a work area when the CPU10 executes a control program, and as a storage area in which image data to be reproduced is temporarily stored. On the other hand, in the EEPROM, a control program, a table or a calculation formula to be used for BLD control, various parameters, and the like are stored.

The LCD display unit 16 is mainly composed of a transmissive LCD panel 16a and a backlight unit 16b. As illustrated in FIG. 2, the backlight unit 16b is provided on a back face of the LCD panel 16a, and a diffuser plate 16c is provided between the LCD panel 16a and the backlight unit 16b. The backlight unit 16b is divided into a plurality of LED segments 16e (light emission areas) by partition plates 16d, and is composed of LED array in which one LED 16f is arranged for each of the divided LED segments 16e. The plurality of LEDs 16f is connected to an LED driver 30, and can be independently driven. Accordingly, it allows each of the LEDs 16f to emit light at arbitrary luminance. Partition plates 16d provided around each of the LEDs 16f prevent light from leaking to a periphery. The backlight unit 16b composed of array of the LEDs 16f is used in combination with the diffuser plate 16c, so that backlight from each of the LEDs 16f is diffused to prevent unevenness. As above, the backlight unit 16b is capable of performing the backlight local dimming (BLD) individually setting light emission luminance (backlight luminance) with respect to the LCD panel 16a for each of the divided LED segments 16e.

The video signal creation unit 20 converts image data temporarily stored in the memory 12 into video signals to display the image data in the LCD panel 16a, and applies gamma correction (inverse gamma correction) corresponding to gamma characteristics of the LCD display unit 16 to the video signals to output the video signals to the LCD control unit 24. The LCD control unit 24 inputs parameters (such as brightness) for adjusting image quality from the LCD image quality parameter creation unit 22 to control the LCD driving unit 26 in accordance with the video signals received from the video signal creation unit 20 and the parameters received from the LCD image quality parameter creation unit 22. The LCD driving unit 26 drives the LCD panel 16a by using control signals corresponding to the video signals supplied from the LCD control unit 24 to control transmittance for each of LCD elements (display elements).

On the other hand, the backlight control signal creation unit 28 has a function of extracting a plurality of pixels corresponding to each of the LED segments 16e of the backlight unit 16b (extract unit), a function of controlling the backlight local dimming (BLD), and the like. The backlight control signal creation unit 28 creates backlight control signals for controlling luminance of each of the LED segments 16e in accordance with an image to be reproduced and displayed in the LCD display unit 16, and tag information to be analyzed by the tag information analysis unit 34. Details of the backlight control signal creation unit 28 is described later.

The LED driver 30 individually drives the LED segments 16e of the backlight unit 16b by using backlight control signals supplied from the backlight control signal creation unit 28 to allow each of the LED segments 16e to emit backlight. Although one of the LED segments 16e emits light with one LED 16f, one of the LED segments 16e may emit light with a plurality of LEDs 16f.

The image storage 32 is composed of a memory card, a hard disk device, and the like, for example, to store an image file of a still picture or a moving image, to be displayed in the LCD display unit 16. The image storage 32 is not limited to that built in a device, but may be also an external recording medium such as a memory card which is connected through an interface.

The tag information analysis unit 34 extracts tag information from the image file acquired from the image storage 32, to be displayed, to output the extracted tag information to the backlight control signal creation unit 28.

As illustrated in FIG. 1, the image display device 1 includes: the CPU10 (image file acquisition unit) that acquires an image file including an image created by a digital camera (reference number 50 in FIG. 3) to be described later, and tag information added to the image by the digital camera 50; the LCD panel 16a (transmissive display panel) that displays the image of the acquired image file; the backlight unit 16b that is divided into a plurality of light emission areas, and that is capable of performing the backlight local dimming (BLD) for setting backlight luminance with respect to the LCD panel 16*a* for each of the divided light emission areas; the tag information analysis unit 34 (tag information analysis unit) that analyzes the acquired tag information in the image file; and the backlight control signal creation unit 28 (control unit) that determines whether or not to perform the BLD of the backlight unit 16*b*, in accordance with an analysis result of the tag information in the image file acquired by the tag information analysis unit 34, and that detects luminance for each of divided image areas of the image in the image file is divided (areas into which the whole area of the image is divided corresponding to light emission areas of the backlight unit 16*b*) to determine backlight luminance for each of divided light emission areas of the backlight unit 16*b* in accordance with the detected luminance for each of the image areas in a case where it is determined to perform the BLD, as well as controls backlight luminance so that the backlight luminance of all the image in the image file becomes uniform in a case where it is determined not to perform the BLD. A specific example of determination whether to perform the BLD or not based on a tag analysis result is described in detail later.

[Wide DR Image]

Next, a wide DR image, to which an image processing method in accordance with the presently disclosed subject matter is applied, is described.

Figure 3:
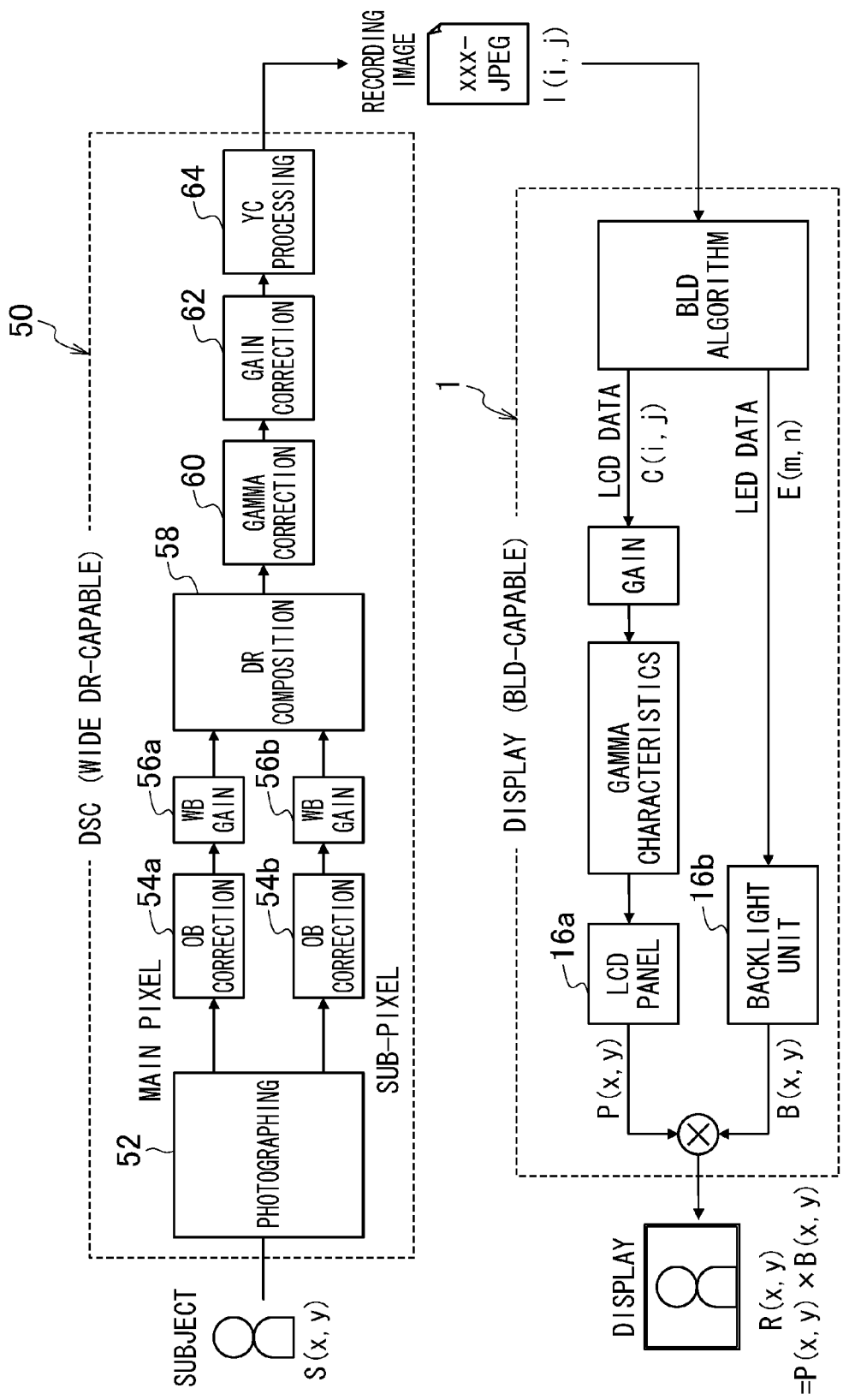
FIG. 3 is a block diagram illustrating main sections of a digital camera for photographing and an image display device.

FIG. 3 is a block diagram illustrating an image display system including the digital camera 50 that acquires and records an image including a wide DR image, and the image display device 1 that displays a wide DR image and the like. FIG. 3 illustrates only a main section of each of the image display device 1 and the digital camera 50.

In FIG. 3, the digital camera 50 has a photographing unit 52 provided with an imaging element that has two types of photodiode groups with different sensitivity, or two types of photodiode groups with the same sensitivity, in which exposure time can be individually controlled. The photographing unit 52 simultaneously outputs a pixel with high sensitivity (hereinafter referred to as a "main pixel") and a pixel with low sensitivity (hereinafter referred to as a "sub-pixel") at the time of photographing a wide DR image. An image (high-sensitivity image) composed of the main pixels is an image having standard (normal) brightness, and an image (low-sensitivity image) composed of the sub-pixels is an image with underexposure. A low-sensitivity image is an image acquired by a photodiode group with low sensitivity in a case of an imaging element having two types of photodiode groups with different sensitivity, and is an image acquired by a photodiode group in which exposure time is shorter than exposure time to acquire an image having standard brightness in a case of an imaging element having two photodiode groups with the same sensitivity.

Image data of main pixels and that of sub-pixels output from a photographing unit 52 are added to a dynamic range (DR) composition unit 58 after signal components of an optical black (OB) area are removed by optical black (OB) correction units 54*a* and 54*b*, respectively, and white balance correction is applied to the image data of the main pixels and that of the sub-pixels by white balance (WB) correction units 56*a* and 56*b*, respectively.

Each of RAW data of a high-sensitivity image and that of a low-sensitivity image supplied to the DR composition unit 58 is 14-bit data (0 to 16383). A sensitivity ratio of the high-sensitivity image and the low-sensitivity image is indicated as n:1 (n>1). Thus, the low-sensitivity image has a sensitivity ratio of 1/n with respect to the high-sensitivity image.

In a case where wide DR composition is applied to the high-sensitivity image and the low-sensitivity image, the high-sensitivity image is compressed to 1/n, and a pixel of the high-sensitivity image is used for a pixel having luminance equal to or less than a predetermined threshold value S1 that shows a boundary between a low luminance portion and a high luminance portion, as well as a pixel of the low-sensitivity image is used for a pixel exceeding the threshold value S1. For a pixel exceeding the threshold value S1 up to saturation of the high-sensitivity image, the pixel of the high-sensitivity image and the pixel of the low-sensitivity image may be mixed at a proper ratio. In addition, the high-sensitivity image is compressed to 1/n, so that noise components also can be compressed to 1/n, whereby it is possible to achieve high picture quality compared with a case of using only the low-sensitivity image.

A wide dynamic range (DR) image may be created for example by composition of an image (first photographed image) acquired by a photodiode group with standard sensitivity and an image (second photographed image) acquired by a photodiode group with lower-sensitivity than the photodiode group with the standard sensitivity. In a case where the photographing unit 52 has two photodiode groups with the same sensitivity, the wide dynamic range (DR) image may be created by composition of an image with standard exposure (first photographed image) and an image photographed with low exposure caused by short exposure time (second photographed image) with respect to the image with the standard exposure.

A gamma correction unit 60 applies gamma correction to the wide DR image compounded by the DR composition unit 58. The gamma correction unit 60 applies the same gamma correction as that for a normal image (high-sensitivity image). In addition, the image is converted from 14-bit data into 8-bit data (0255) at the time of the gamma correction.

A gain correction unit 62 subsequently applies gain correction to the wide DR image to which the gamma correction is applied by the gamma correction unit 60. The wide DR image has a sensitivity of 1/n of that of a normal image as described earlier, so that a low-sensitivity portion becomes dark. The gain correction unit 62 performs the gain correction so that a half tone including a low-sensitivity portion of the wide DR image increases. Thus, in a case where a value to which a value R1 of the high-sensitivity image corresponding to the threshold value S1 changed after the gamma correction is indicated as D1, the gain correction is performed so that a value of the wide DR image after the gamma correction and the gain correction becomes D1.

In the wide DR image, it is perceived that gradation of a high luminance portion is reduced compared with gradation of a low luminance portion.

After a synchronization processing unit (not illustrated) applies synchronization processing to the wide DR image after the gain correction applied by the gain correction unit 62, a YC processing unit 64 converts the wide DR image into a luminance signal Y and color difference signals Cr and Cb, and compresses the signals in accordance with a JPEG method, and then the signals are recorded in a recording medium (not illustrated) and the like of the camera.

Although the digital camera 50 illustrated in FIG. 3 has the gamma correction unit 60 and the gain correction unit 62, one correction unit may perform these gradation conversion.

[BLD Control]

Next, the backlight local dimming (BLD) control of the image display device 1 in accordance with the presently disclosed subject matter is described.

In FIG. 3, when a wide DR image photographed as described above is acquired, LCD data C(i,j) is created in accordance with the wide DR image, as well as LED data E(m,n) (backlight control signals) is created in accordance with BLD algorithm of the backlight control signal creation unit 28. Gain correction, inverse gamma correction by gamma characteristics of the LCD display unit 16, and the like, are applied to the LCD data C(i,j) so that the LCD data C(i,j) is supplied to the LCD panel 16a. Accordingly, each of display elements of the LCD panel 16a is controlled so as to have transmittance corresponding to the wide DR image.

In addition, light emission luminance of each of LED segments of the backlight unit 18 is controlled by the LED data E(m,n).

BLD control is applied to a LED segment (light emission area) corresponding to an image area with high luminance that exceeds a threshold value, for example, so that backlight luminance of the LED segment becomes higher than normal backlight luminance. As a result, it is possible to extend a high luminance portion of a recorded image and more faithfully reproduce and display a photographed scene. In a case where a maximum value of display luminance of a normal image is 250 cd/m$^2$, for example, and a maximum value of display luminance of the wide DR image is set at 750 cd/m$^2$, for example, it is possible to display the wide DR image by increasing the DR three times.

The high luminance portion as well as the low luminance portion may be linearly varied in proportion to subject luminance, or in a case where a maximum value of display luminance is limited, the high luminance portion may be varied along a polygonal line or a curve so that the maximum value of display luminance corresponds with a maximum value of the subject luminance.

[Image File]

Figure 4:
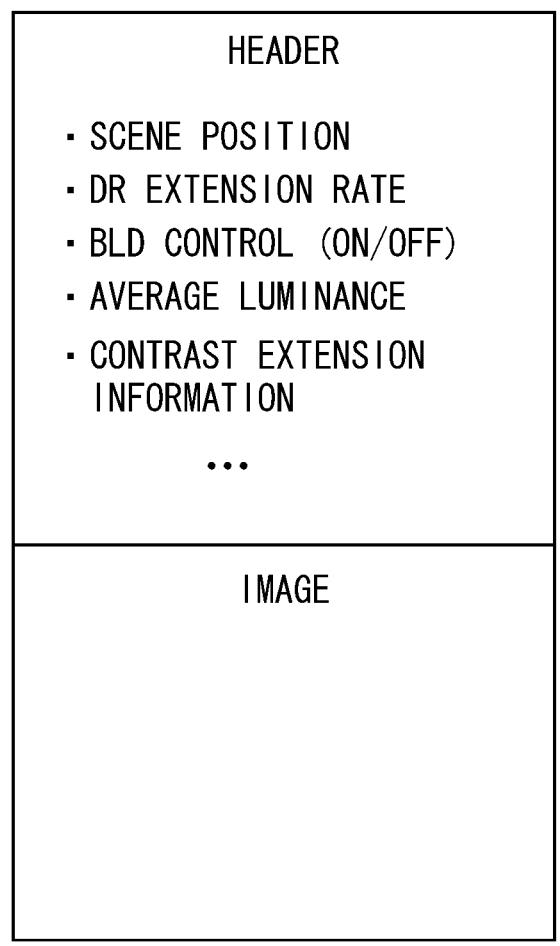
FIG. 4 is an illustration illustrating an example of an image file.

FIG. 4 is an illustration illustrating an example of an image file. The image file of the example is composed of a header (tag information) and an image. The image is image data created by the digital camera 50 for photographing, and the header is composed of tag information added to the image by the digital camera 50. The tag information includes a scene position, a dynamic range (DR) extension rate, a BLD control tag, average luminance, contrast extension information, and the like.

The scene position serves as a mode (photographing mode) that is selected in the digital camera 50 at the time of photographing an image, and corresponds to a photographing scene that a photographer intends to photograph. In the digital camera 50, exposure control is generally different for each of scene positions. The scene position is also called an "exposure control mode". An example of the scene position is a portrait photographing mode, a landscape photographing mode, and the like.

The DR extension rate (DR extension information) shows whether an image created by the digital camera 50 is an image (wide DR image) in which a dynamic range is extended or not, as well as a degree of extension of the dynamic range. In a case of an image which a dynamic range is extended (wide DR image), the DR extension rate is more than 100% (such as 200%, and 400%), and in a case of an image which a dynamic range is not extended (non-wide DR image), the DR extension rate is 100%.

The BLD control tag is control information that shows whether to perform the backlight local dimming or not.

The average luminance is information showing an average of backlight luminance in the whole light emission area of the backlight unit 16b at the time of performing the backlight local dimming in the backlight unit 16b.

The contrast extension rate is information showing a degree of contrast extension at the time of performing the backlight local dimming in the backlight unit 16b.

[Image Display Method]

Next, the image display method in accordance with the presently disclosed subject matter is described.

Figure 5:
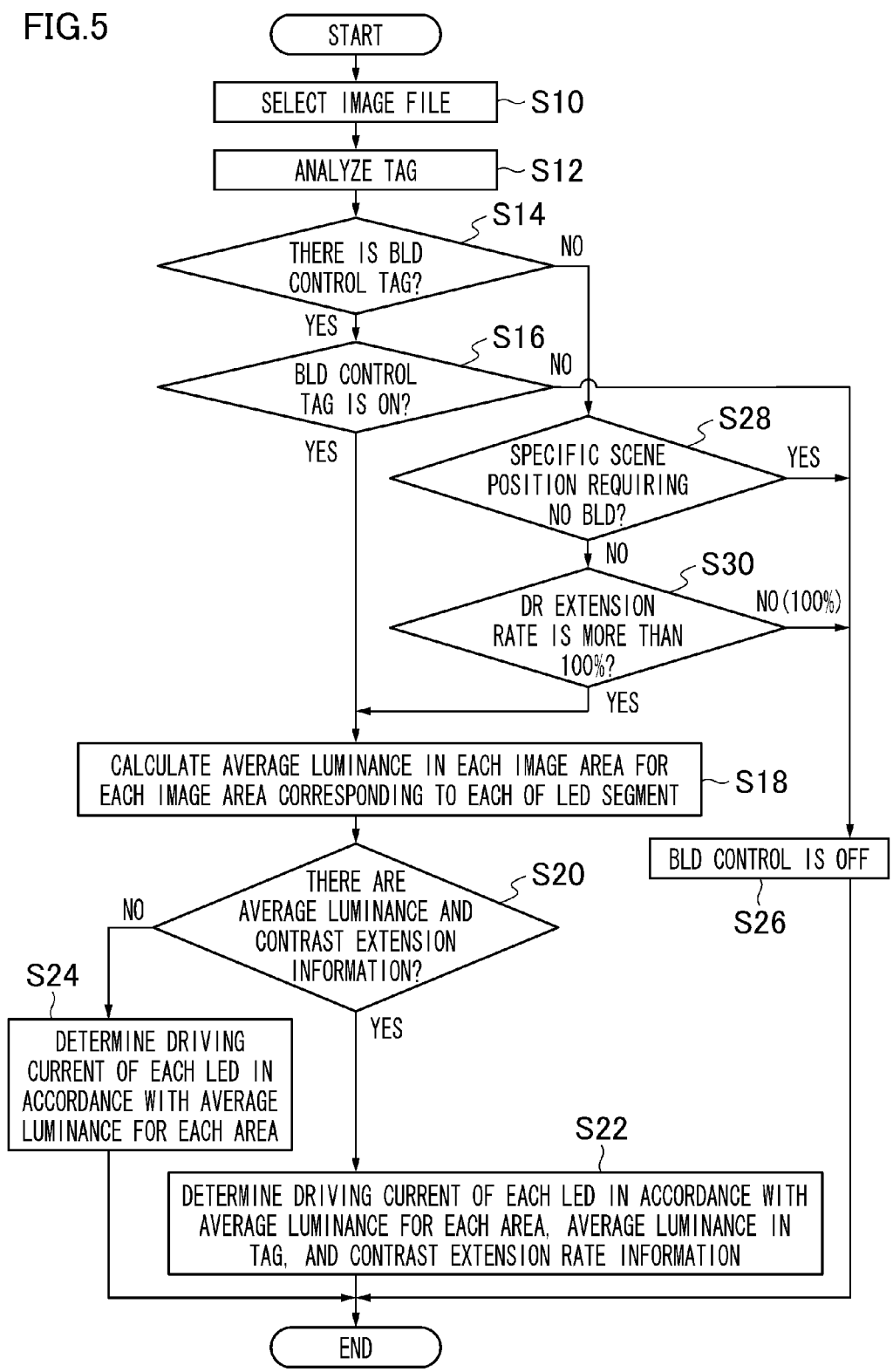
FIG. 5 is a flow chart illustrating an overall flow of an example of the image display method in accordance with the presently disclosed subject matter.

FIG. 5 is a flow chart illustrating an overall flow of an example of the image display method in accordance with the presently disclosed subject matter. Processing in the flow chart is performed by the CPU10 described in FIG. 1 in accordance with a program.

In FIG. 5, when a desired image file from among a plurality of image files stored in the image storage 32 is selected by the operation unit 14, the selected image file is acquired from the image storage 32 (step S10), thus, the image file is temporarily stored in the memory 12. It is unnecessary to store all the image file in the memory 12, therefore, first only a header may be copied in the memory 12, for example, and only necessary portions may be copied in the memory 12 if necessary. Next, tag information of the acquired image file is analyzed by the tag information analysis unit 34 (step S12), and it is determined whether there is a BLD control tag in a header (tag information) of the image file or not (step S14).

In a case where there is the BLD control tag in the header (tag information) of the image file, the tag information analysis unit 34 determines whether the BLD control tag shows turning-on (step S16), that is, it is determined whether the BLD control tag in the tag information shows turning-on or not (the BLD is activated) or turning-off (the BLD is deactivated).

In a case where there is the BLD control tag in the tag information in the image file ("Yes" in the step S14), and the BLD control tag shows turning-on (the BLD is activated) ("Yes" in the step S16), the backlight control signal creation unit 28 performs control of steps S18 to S24.

First, the backlight control signal creation unit 28 calculates average luminance for each of a plurality of image areas of an image, corresponding to each of a plurality of LED segments 16e (light emission areas) of the backlight unit 16b illustrated in FIG. 2 (step S18). In a case where the backlight unit 16b is divided into LED segments 16e of M×N segments (M and N are integers of 2 or more), the image is divided into M×N image areas so that an average value of a luminance value of each of the image areas (average luminance by an area) is calculated for each of the divided image areas.

Next, the backlight control signal creation unit 28 determines whether there is average luminance and contrast extension information in the tag information in an image file (step S20). The average luminance shows an average value of backlight luminance in the whole light emission area (all of the M×N LED segments) of the backlight unit 16b. The contrast extension information shows a degree of contrast extension at the time of performing the backlight local dimming.

Next, the backlight control signal creation unit 28 determines LED data E(m,n) of each of the LEDs 16e in accordance with the average luminance by the image area calculated in the step S18, the average luminance in the tag information showing average luminance of the whole image area, and the contrast extension information (step S22), that is, determines driving current of each of the LEDs 16e.

In a case where there is no information "backlight average luminance" and "a contrast extension rate" in the tag information in the image file (in a case of "No" in the step S20), each LED data E(m,n) is calculated in accordance with the average luminance by the area calculated in the step S18 (step S24), that is, driving current of each of the LEDs 16e is determined.

Backlight luminance E of the LED segments (m,n) is controlled by using the LED data E(m,n) calculated as above, so that it is possible to faithfully reproduce and display an actual photographing scene.

Next, processing in a case where there is no BLD control tag (backlight local dimming control information) in the header of the image file is described.

In a case of "No" in the step S14 (in a case where there is no BLD tag in the header of the image file), the backlight control signal creation unit 28 determines whether to perform the BLD or not in accordance with information on the photographing mode in the header of the image file (steps S28 to S30).

First, it is determined whether the scene position selected in the digital camera 50 at the time of photographing is a specific scene position in which the BLD is unnecessary or not (step S28). The scene position shows a photographing scene (or exposure control) that is selected by a photographer or the digital camera 50. In a case where the portrait photographing mode is selected as a specific scene position at the time of photographing, for example, the backlight control signal creation unit 28 determines not to perform the BLD.

In a case where the portrait photographing mode (a mode for performing exposure control suitable for a portrait at the time of photographing a portrait as a subject) is selected in a photography device 50 at the time of photographing, for example, it is determined that the backlight local dimming (BLD) is not to be performed (deactivated).

Next, it is determined whether dynamic range (DR) extension is performed in the photography device 50 at the time of photographing or not (step S30). In the DR extension, a wide dynamic range image is created by using an image photographed with high sensitivity and an image photographed with low sensitivity. In the embodiment, in a case where the DR extension is performed in the photography device 50, there is a DR extension tag (dynamic range extension information) showing a degree of extension of a dynamic range (a DR extension rate in the embodiment) in the header of the image file. Accordingly, the backlight control signal creation unit 28 determines that if the DR extension rate is 200% or more, the BLD is to be performed, and if the DR extension rate is 100%, the BLD is not to be performed, in accordance with the DR extension tag.

In a case where, in the steps S28 to S30, it is determined to perform the BLD (in a case of "No" in the step S28, and "Yes" in the step S30), the BLD control in the steps S18 to S24 is performed. In a case where it is determined not to perform the BLD (in a case of "Yes" in the step S28, and "No" in the step S30), the BLD control is not performed (step S26).

Figure 6:
FIG. 6 is an illustration used to explain portrait photographing mode.

As illustrated in FIG. 6, in a case of photographing a portrait, performing contrast extension by using the BLD results in so-called a "high-contrast picture". Particularly, an image photographed in DR range non-extension (a DR extension rate is 100%) is displayed with appropriate gradation even if the backlight local dimming (BLD) is not performed, because subject luminance is properly allocated within gradation of a predetermined bit (such as 8-bit). If displayed by performing the BLD, contrast is enhanced to generally deviate a skin color of the portrait from a proper color.

In a case where the landscape photographing mode (a mode for performing exposure control suitable for a landscape at the time of photographing a landscape as a subject) is selected in the photography device 50 at the time of photographing, for example, it is determined that the backlight local dimming (BLD) is to be performed.

Figure 7:
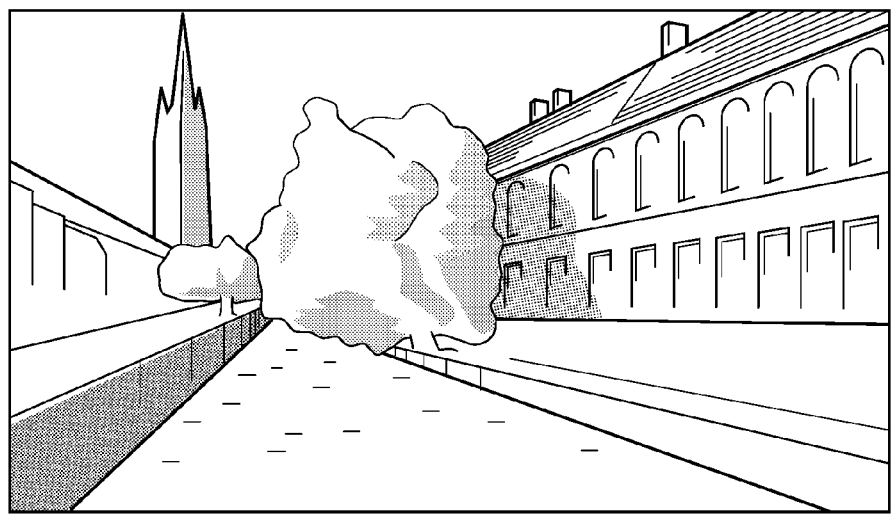
FIG. 7 is an illustration used to explain landscape photographing mode.

In a landscape such as illustrated in FIG. 7, colors of a blue sky, trees, and the like, have relatively high chroma, and a light-dark difference is large in many cases. Therefore, photographing by extending a dynamic range (DR) in the photography device 50 is performed with a high frequency. Thus, even in a scene in which clipped highlights or clipped shadows tend to occur in photographing with DR range non-extension (a DR extension rate is 100%), compression of subject luminance at a predetermined bit (such as 8-bit) is performed by photographing with DR extension (a DR extension rate is 400%, for example), whereby gradation of the whole image is not lost. Unfortunately, if a landscape image photographed with DR extension is displayed in the image display device 1 still in a state in which the BLD is not performed, luminance compression is performed by the DR extension in the photography device 50, thereby resulting in so-called a "low-contrast picture". In a case where the landscape photographing mode is selected in the photography device 50 at the time of photographing (or in a case of photographing with DR extension), performing the BLD in the image display device 1 enables an image to be displayed with appropriate gradation.

As above, the tag information analysis unit 34 determines whether there is a BLD control tag (control information) showing whether to perform the BLD in the backlight unit 16b or not, in acquired tag information in an image file or not. The backlight control signal creation unit 28 (control unit) detects luminance for each of divided image areas of an image in an image file to perform the BLD in a case where there is a BLD control tag in tag information in the image file as well as the BLD control tag shows that the BLD is to be performed, and controls backlight luminance so that the backlight luminance of all the image in the image file becomes uniform in a case where there is a BLD control tag in tag information in the image file as well as the BLD control tag shows that the BLD is not to be performed. The tag information analysis unit 34 extracts information on the photographing mode selected in the digital camera 50 at the time of photographing the image from the acquired tag information in the image file, and the backlight control signal creation unit 28 performs control of determining whether to perform the BLD or not, in accordance with the information on the photographing mode extracted by the tag information analysis unit 34, in a case where there is no control information on the BLD in the tag information in the image file. In addition, the tag information analysis unit 34 extracts information showing an average of backlight luminance (average luminance) in the whole light emission area of the backlight unit 16b at the time of performing the BLD, and information showing a degree of contrast extension (contrast extension information) at the time of performing the BLD, from the tag information in the image file, and the backlight control signal creation unit 28 controls the backlight luminance of the backlight unit 16b in accordance with the average luminance and the contrast extension information extracted by the tag information analysis unit 34.

Although FIG. 5 illustrates a case in which BLD control is performed in accordance with a BLD control tag, the presently disclosed subject matter includes a case in which the steps S28 and S30 are performed by omitting the steps S14 and S16, and although FIG. 5 illustrates a case in which the BLD control is performed in accordance with a photographing mode, the presently disclosed subject matter includes a case in which the steps S28 and S30 are omitted.

Figure 8:
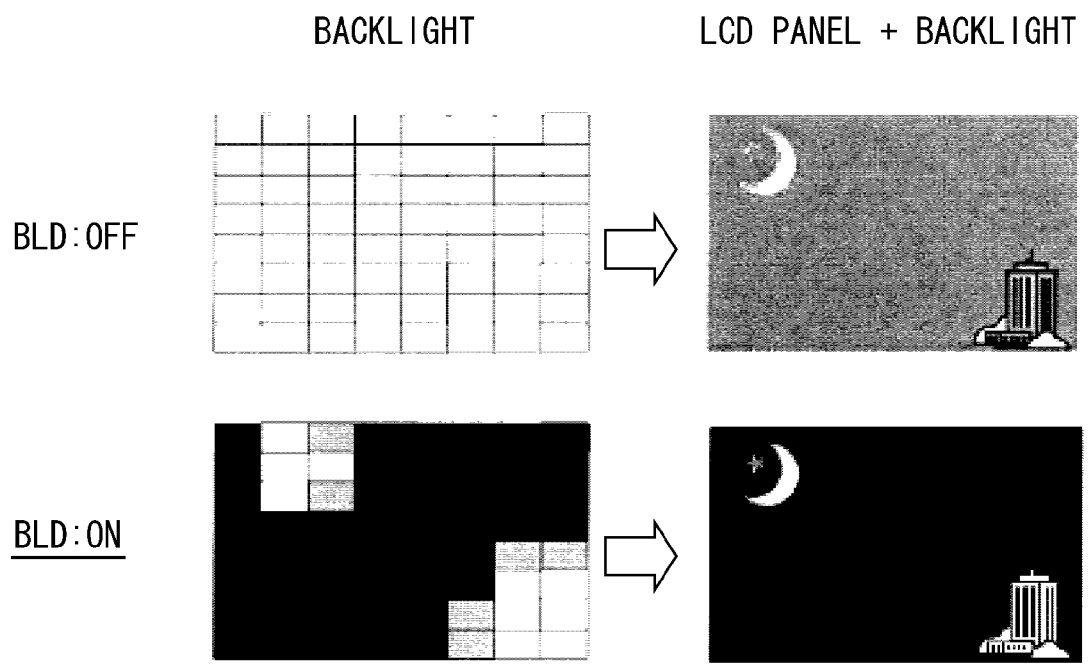
FIG. 8 is an illustration used to explain a difference between cases where a backlight local dimming is performed and is not performed.

FIG. 8 illustrates a difference between BLD-OFF (in a case where the backlight local dimming is not performed) and BLD-ON (in a case where the backlight local dimming is performed).

In FIG. 8, in a case of the BLD-OFF, the backlight control signal creation unit 28 makes backlight luminance of all the image uniform. On the other hand, in a case of the BLD-ON, luminance for each of divided image areas of an image is detected so that backlight luminance is determined for each of light emission areas (LED segments) of the backlight unit 16*b* in accordance with the luminance for each of the detected image areas. In addition, in a case of the BLD-ON, backlight luminance is increased in a light emission area corresponding to an image area in which luminance is higher than a threshold value (an area in which the moon and a building are displayed, in the image in the figure), backlight luminance is decreased in a light emission area corresponding to an image area in which luminance is lower than the threshold value (a dark area in the image in the figure).

Figure 9:
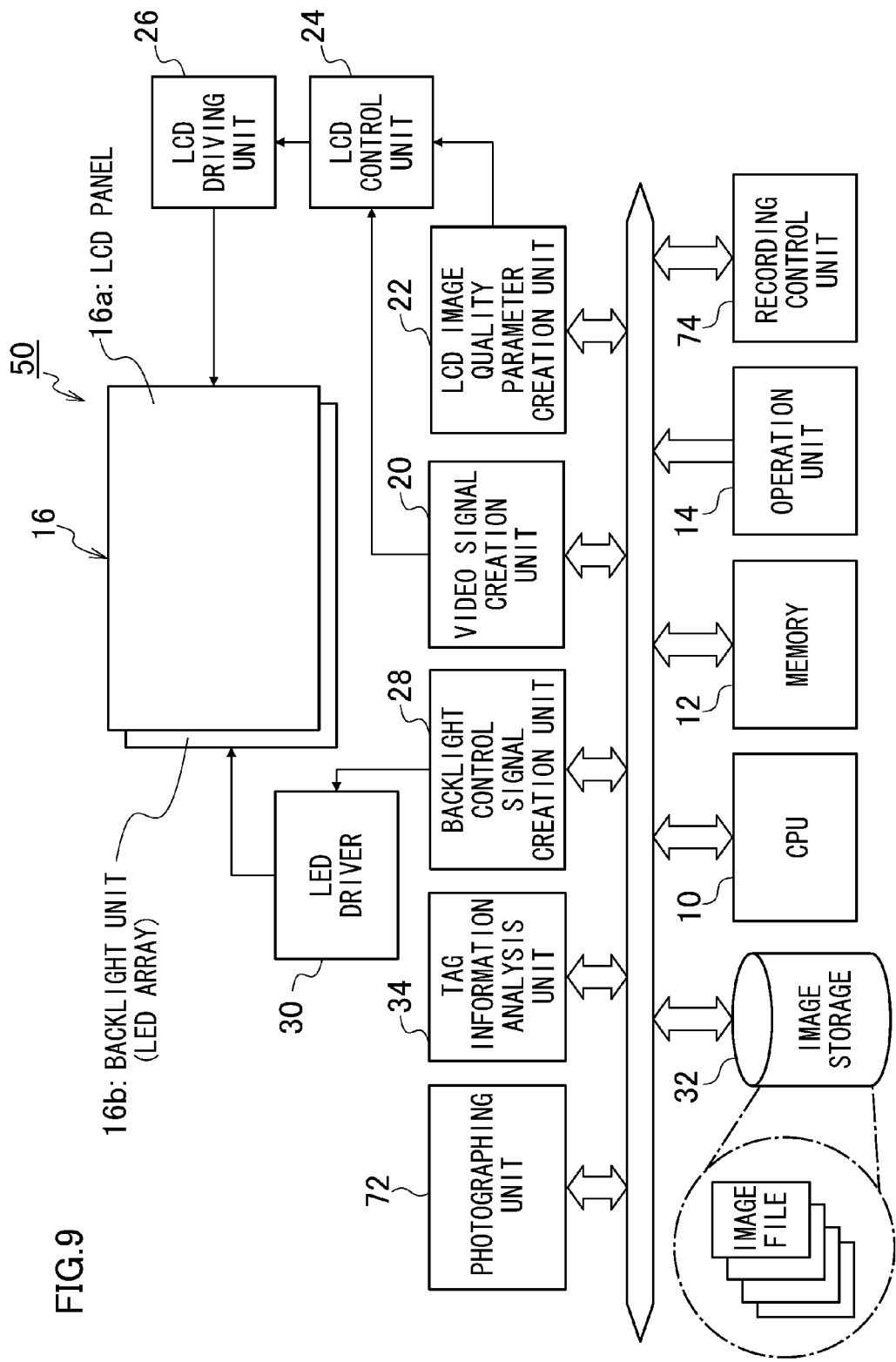
FIG. 9 is a block diagram illustrating an example of a digital camera.

FIG. 9 is a block diagram illustrating an embodiment of the whole configuration of the digital camera 50 illustrated in FIG. 3. In FIG. 9, a component having the same function as that of the component of the image display device 1 illustrated in FIG. 1 is indicated by the same reference numeral as that of the component of the image display device 1 in FIG. 1.

In FIG. 9, a photographing unit 72 is configured by including the photographing unit 52, the OB correction units 54*a* and 54*b*, the WB correction units 56*a* and 56*b*, the DR composition unit 58, the gamma correction unit 60, the gain correction unit 62, and the YC processing unit 64, illustrated in FIG. 3.

The operation unit 14 of the present embodiment also receives input of a photographing instruction.

The photographing unit 72 photographs a subject to create an image when a photographing instruction is input in the operation unit 14.

The recording control unit 74 creates a BLD control tag showing whether to perform the backlight local dimming of the backlight unit 16*b* or not, in accordance with photographing conditions of a subject at the time of photographing to add tag information including the BLD control tag to an image, and records an image file including the image and the tag information in an image storage.

Figure 10:
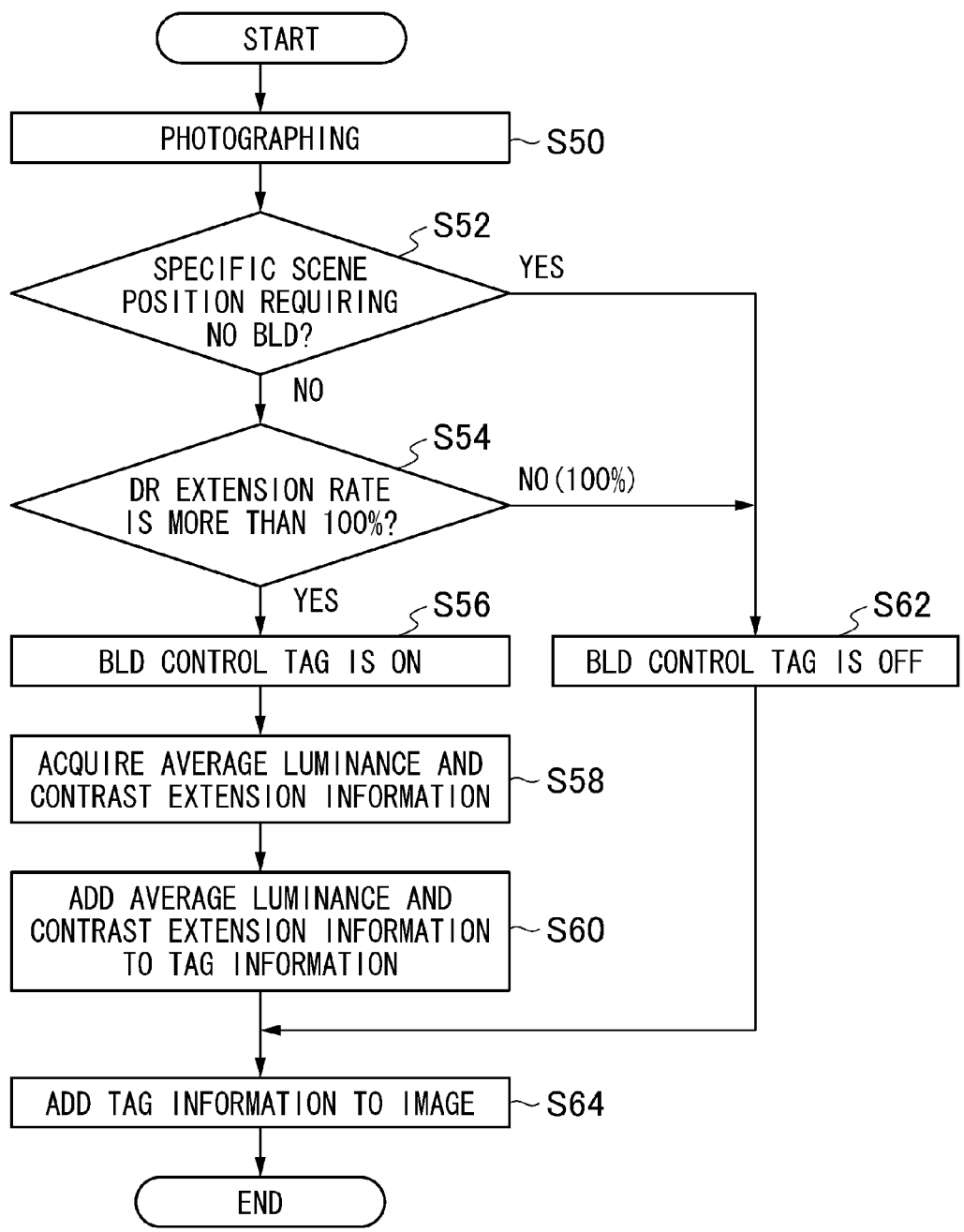
FIG. 10 is a flow chart illustrating a flow of an example of a photographing process.

FIG. 10 is a flow chart illustrating an overall flow of an example of photographing processing in the digital camera 50 in FIG. 9. The processing is performed by the CPU 10 in accordance with a program. Hereinafter, control processing in a camera is described with reference to FIG. 10.

First, when a photographing instruction is input in the operation unit 14, the photographing unit 72 photographs a subject to create an image (step S50). The created image is temporarily stored in the memory 12.

Next, it is determined whether a scene position selected at the time of photographing is a specific scene position in which the BLD is unnecessary (step S52). This step is identical with the step S28 in FIG. 5, therefore, detailed description is omitted.

Then, it is determined whether dynamic range (DR) extension is performed at the time of photographing (step S54). This step is identical with the step S30 in FIG. 5, therefore, detailed description is omitted.

In a case where, in the steps S52 to S54, it is determined to activate the BLD control (in a case of "No" in the step S52, and "Yes" in the step S54), steps S56 to S60 are performed. In a case where it is determined to deactivate the BLD control (in a case of "Yes" in the step S52, or "No" in the step S54), step S62 is performed.

In the step S56, a BLD control tag showing that the backlight local dimming is to be performed when an image is displayed is written in a header of an image file, that is, the BLD control tag is activated.

In step S58, average luminance and contrast extension information are acquired.

The average luminance is information showing an average of backlight luminance in the whole light emission area of the backlight unit 16*b* at the time of performing the BLD. The CPU 10 of the present embodiment calculates the average luminance in accordance with the image constituting the image file, and the CPU 10, for example, calculates an average of luminance values of the whole image area of an image to use the calculated average as the average luminance.

The contrast extension information is information showing a degree of contrast extension at the time of performing the BLD, and, for example, a contrast extension rate showing a ratio of contrast of a case where the BLD is not performed and contrast of a case where the BLD is performed is used. However, it is unnecessary that the contrast extension information is indicated by a specific numeric value (such as % unit). The contrast extension information may be indicated by a plurality of levels (such as three levels of large, middle, and small), for example. The control unit 50 of the present embodiment acquires the contrast extension information in accordance with a photographing condition or a photographing mode (such as a type of a scene position). In a case where photographing is performed with a scene position in which the BLD is to be performed, such as a night scene photographing mode, and a landscape photographing mode, preferable contrast extension information is determined for each of the scene positions.

In the step S60, the calculated average luminance and contrast extension information is written in the header (tag information) of the image file.

In the step S62, information (the BLD is deactivated) showing that the backlight local dimming is not to be performed when the image is displayed is written in the header of the image file as the BLD control tag.

In the step S64, the image and the header (tag information) are recorded in a recording medium.

As above, although an example of a case in which the digital camera 50 is provided with a display unit having a BLD function is described, the presently disclosed subject matter includes a case in which the digital camera 50 is provided with a display unit having no BLD function.

Although the digital camera 50 is described above as an example of a portable type electronic apparatus serving as a photography device, a configuration of the portable type electronic apparatus is not limited to the digital camera 50. The presently disclosed subject matter is applicable to other portable type electronic apparatuses, such as a built-in or an external PC camera, or a portable terminal device having a photographing function such as described below.

A portable terminal device, such as a cellular phone, a smartphone, a Personal Digital Assistant (PDA), and a portable type game machine, is a second embodiment of the portable type electronic apparatus in accordance with the presently disclosed subject matter. Hereinafter, a smartphone is described in detail as an example with reference to drawings.

[Configuration of Smartphone]

Figure 11:
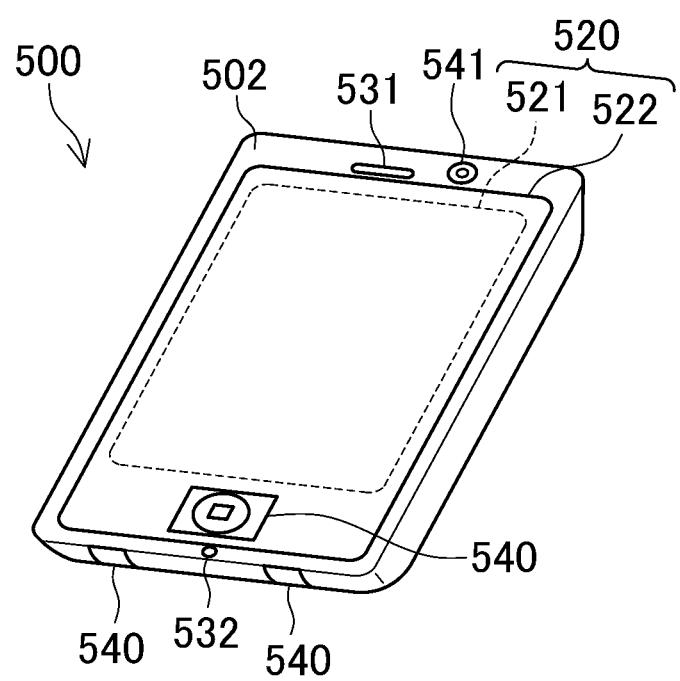
FIG. 11 is an external view of a smartphone serving as another embodiment of a portable type electronic apparatus in accordance with the presently disclosed subject matter.

FIG. 11 illustrates an appearance of a smartphone 500 serving as another embodiment of a portable type electronic apparatus in accordance with the presently disclosed subject matter. The smartphone 500 illustrated in FIG. 11 has a tabular body 502 that is provided on its one face with a display-input unit 520 into which a display panel 521 serving as a display and an operation panel 522 serving as an input section are integrated. In addition, the body 502 includes a speaker 531, a microphone 532, an operation unit 540, and a camera unit 541. A configuration of the body 502 is not limited to the above, therefore, it is possible to apply a configuration in which a display and an input section are separated, a foldable structure, or a configuration having a slide mechanism, for example.

Figure 12:
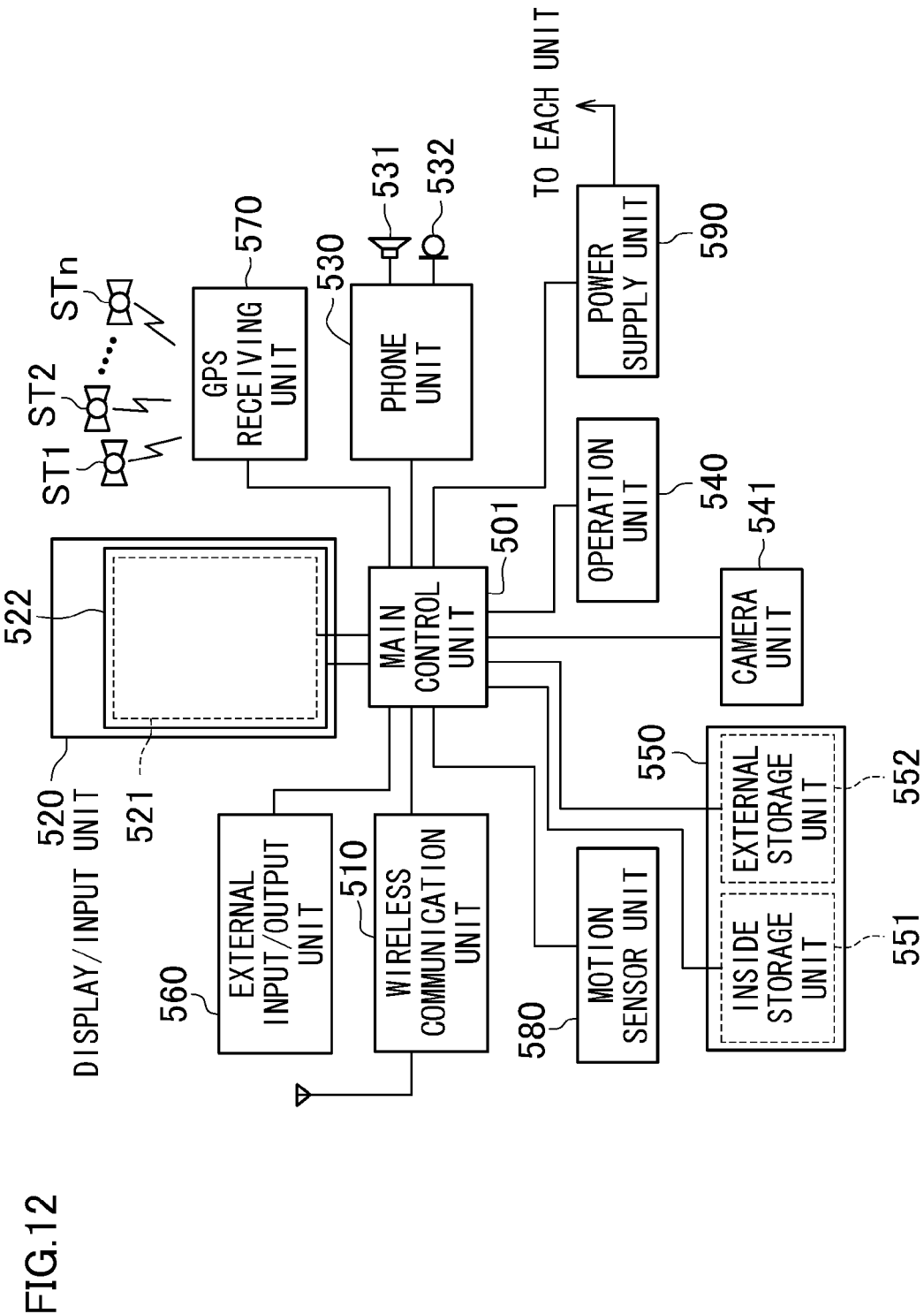
FIG. 12 is a block diagram illustrating a configuration of the smartphone.

FIG. 12 is a block diagram illustrating a configuration of the smartphone 500 illustrated in FIG. 11. As illustrated in FIG. 12, the smartphone includes the following as main components: a wireless communication unit 510; a display-input unit 520; a phone unit 530; an operation unit 540; an camera unit 541; a storage unit 550; an external input-output unit 560; a Global Positioning System (GPS) receiving unit 570; a motion sensor unit 580; a power supply unit 590; and a main control unit 501. In addition, the smartphone 500 has a wireless communication function of performing mobile wireless communication through a base station device BS and a mobile communication network NW, as a main function.

The wireless communication unit 510 performs wireless communication with respect to the base station device BS installed in the mobile communication network NW in accordance with an instruction of the main control unit 501. By using the wireless communication, transmission and reception of various file data such as voice data and image data, electronic mail data, and reception of Web data, streaming data and the like, are performed.

The display-input unit 520 is so-called an operation panel that displays an image (a still image and a dynamic image), character information, and the like, by control of the main control unit 501 to visually transmit information to a user, as well as detects a user operation with respect to the displayed information, and the display-input unit 520 includes the display panel 521 and the operation panel 522.

The display panel 521 is formed by using a Liquid Crystal Display (LCD) and the like as a display device. The operation panel 522 is mounted so that an image displayed in a screen of the display panel 521 is visible, and is a device that detects one or more coordinate by an operation with a finger of a user or a stylus. When the device is operated with a finger of a user or a stylus, a detection signal caused by the operation is outputted to the main control unit 501. The main control unit 501 then detects an operation position (coordinate) on the display panel 521 in accordance with the received detection signal.

The display panel 521 of the present embodiment is capable of performing the backlight local dimming (BLD) by control of the main control unit 501.

As illustrated in FIG. 11, the display panel 521 and the operation panel 522 of the smartphone 500 are integrated to configure the display-input unit 520 in which the display panel 521 is arranged so as to be completely covered with the operation panel 522. In a case where the arrangement above is applied, the operation panel 522 may include a function of detecting a user operation in an area outside of the display panel 521, that is, the operation panel 522 may include a detection area (hereinafter referred to as a display area) for an overlapping portion overlapped with the display panel 521, and a detection area (hereinafter referred to as a non-display area) for an outer periphery other than the display area, which does not overlap with the display panel 521.

A size of the display area may correspond with a size of the display panel 521, however, it is unnecessary to allow both sizes to correspond with each other. In addition, the operation panel 522 may include two sensitive areas of an outer periphery and an inside area other than the outer periphery. Further, a width of the outer periphery can be appropriately designed depending on a size of the body 502 and the like. Furthermore, any one of a matrix switch method, a resistive film method, a surface elastic wave method, an infrared ray method, an electromagnetic induction method, and a capacitance method, is applicable to the operation panel 522 as a position detection method.

The phone unit 530 includes the speaker 531 and the microphone 532, and converts voice of a user received through the microphone 532 into voice data that can be processed in the main control unit 501 to output the voice data to the main control unit 501, as well as decodes voice data received by the wireless communication unit 510 or the external input-output unit 560 to output the voice data from the speaker 531. In addition, it is possible to mount the speaker 531 on the same face as a face in which the display input unit 520 is provided, and mount the microphone 532 in a side face of the body 502, for example.

The operation unit 540 is a hardware key using a key switch and the like, and receives an instruction from a user. As illustrated in FIG. 11, for example, the operation unit 540 is mounted in a lower face below a display portion of the body 502 of the smartphone 500, and is a push button switch that is turned on when pressed with a finger and the like, and is turned off by restoring force of a spring and the like when the finger is removed.

The storage unit 550 stores the following: a control program and control data of the main control unit 501; an application software; address data in which names of communications partners are correlated with telephone numbers, and the like; data of electronic mails that are transmitted and received; Web data downloaded by Web browsing; and content data that is downloaded, as well as temporarily stores streaming data and the like. The storage unit 550 is composed of an inside storage unit 551 built in the smartphone and an external storage unit 552 having an external memory slot to which an external storage is detachable. Each of the inside storage unit 551 and the external storage unit 552, which constitute the storage unit 550, is realized by using a storage medium, such as a flash memory type, a hard disk type, a multimedia card micro type, a card type memory (such as a Micro SD (registered trademark) memory), a Random Access Memory (RAM), and a Read Only Memory (ROM).

The external input-output unit 560 serves as an interface with all external apparatuses to be connected to the smartphone 500, in order to directly or indirectly connect to another external apparatus through communication (such as universal serial bus (USB), and IEEE1394) or a network (such as the Internet, a wireless LAN, Bluetooth (registered trademark), Radio Frequency Identification (RFID), Infrared Data Association (IrDA: registered trademark), Ultra Wideband (UWB: registered trademark), and ZigBee (registered trademark).

The smartphone 500 is connected to an external apparatus, such as: a wired/wireless headset; a wired/wireless external charger; a wired/wireless data port; a memory card, a Subscriber Identity Module (SIM) Card/, and an User Identity Module (UIM) Card, which are to be connected through the card socket; an external audio/video apparatus to be connected through an audio/video Input/Output (I/O) terminal, an external audio/video apparatus to be connected with wireless connection; a smartphone to be connected with wired/wireless connection; a personal computer to be connected with wired/wireless connection; a PDA to be connected with wired/wireless connection; a personal computer to be connected with wired/wireless connection; and an earphone. The external input-output unit is capable of transmitting data transmitted from external apparatuses as described above to each of components in the smartphone 500 as well as allowing data in the smartphone 500 to be transmitted to the external apparatuses.

The GPS receiving unit 570 receives GPS signals transmitted from GPS satellites ST1 to STn in accordance with an instruction of the main control unit 501 to perform positioning calculation processing based on the received GPS signals, thereby detects a position of the smartphone 500, defined by a latitude, a longitude, and an altitude. In a case where location information can be acquired from the wireless communication unit 510 and the external input-output unit 560 (such as a wireless LAN), the GPS receiving unit 570 also can detect a position of the smartphone 500 by using the location information.

The motion sensor unit 580 includes a triaxial acceleration sensor and the like, for example, to detect a physical motion of the smartphone 500 in accordance with an instruction of the main control unit 501. By detecting the physical motion of the smartphone 500, a direction and acceleration of the motion of the smartphone 500 are detected. The detection result above is to be output to the main control unit 501.

The power supply unit 590 supplies electric power stored in a battery (not illustrated) to each of units of the smartphone 500 in accordance with an instruction of the main control unit 501.

The main control unit 501 includes a microprocessor and operates in accordance with a control program and control data stored in the storage unit 550 to perform centralized control of each of units of the smartphone 500. In addition, the main control unit 501 has a mobile communication control function of controlling each of units of a communication system, and an application processing function, in order to perform voice communication and data communication through the wireless communication unit 510.

The main control unit 501 of the present embodiment has a function of creating the image file illustrated in FIG. 4, and has a function of adding various tag information pieces such as a scene position, a DR extension rate, BLD control, average luminance, and contrast extension information, to an image. In addition, the main control unit 501 has a function of controlling the BLD of the display panel 521. The main control unit 501 is capable of performing photographing processing illustrated in FIG. 10, and display processing illustrated in FIG. 5 in accordance with a program.

The application processing function is realized by operating the main control unit 501 in accordance with application software stored in the storage unit 550. The application processing function includes an infrared ray communication function of performing data communication with a counterpart device by controlling the external input-output unit 560, an electronic mail function of performing transmission and reception of an electronic mail, a Web browsing function of browsing a Webpage, and the like, for example.

In addition, the main control unit 501 includes an image processing function of displaying a video in the display input unit 520 in accordance with image data (data of a still image and a dynamic image) such as received data and downloaded streaming data, and the like. The image processing function is a function in which the main control unit 501 decodes the image data above and applies image processing to the decoded result to display the image in the display input unit 520.

Further, the main control unit 501 performs display control with respect to the display panel 521 and operation detection control which detects a user operation through the operation unit 540 and the operation panel 522.

Performing the display control allows the main control unit 501 to display a software key such as an icon for starting up application software and a scroll bar, or a window for creating an electronic mail. The scroll bar serves as a software key of receiving an instruction of moving a displaying portion of an image that is too large to fit in a display area of the display panel 21, and the like.

In addition, performing the operation detection control allows the main control unit 501 to detect a user operation through the operation unit 540, and receive an operation with respect to the icon described above and input of a character string into an input section of the window described above, through the operation panel 522, or receive a request for scrolling a display image, through the scroll bar.

Further, performing the operation detection control allows the main control unit 501 to have an operation panel control function of determining whether an operation position with respect to the operation panel 522 is an overlapping portion (display area) overlapped with the display panel 521 or an outer periphery (non-display area) other than the overlapping portion, which does not overlap with the display panel 521, in order to control a sensitive area of the operation panel 522 and a display position of a software key.

The main control unit 501 is also capable of detecting a gesture operation with respect to the operation panel 522 to allow a predetermined function to be performed in accordance with the detected gesture operation. The gesture operation is not a conventional simple touch operation but an operation such as drawing a trail with a finger, assigning a plurality of positions at the same time, or drawing a trail for at least one of the plurality of positions in combination with both operations.

The camera unit 541 is a digital camera of performing electronic photographing by using an imaging element such as a Complementary Metal Oxide Semiconductor (CMOS) and a Charge-Coupled Device (CCD). In addition, the camera unit 541 is capable of converting image data acquired by photographing into compressed image data such as a Joint Photographic coding Experts Group (JPEG) by control of the main control unit 501 to record the compressed image data in the storage unit 550 or output it through the external input-output unit 560 or the wireless communication unit 510. As illustrated in FIG. 11, in the smartphone 500, the camera unit 541 is mounted on the same face as a face in which the display input unit 520 is mounted, but a mounting position of the camera unit 541 is not limited to this. The camera unit 541 may be mounted on a back face of the display input unit 520, or a plurality of camera units 541 may be mounted. In a case where a plurality of camera units 541 is mounted, it is possible to perform photographing with a camera unit 541 selected to be used for the photographing, as well as with using the plurality of camera units 541 at the same time.

The camera unit 541 of the present embodiment has a function of creating a wide dynamic range (DR) image.

In addition, the camera unit 541 is available to various functions of the smartphone 500. It is possible, for example, to display an image acquired by the camera unit 541 in the display panel 521, as well as to use an image acquired by the camera unit 541 as one of operation inputs of the operation panel 522. When the GPS receiving unit 570 detects a position, it is also possible to detect the position by referring to an image received from the camera unit 541. Further, it is also possible to determine an optical axis direction of the camera unit 541 of the smartphone 500 by referring to an image received from the camera unit 541, without using a triaxial acceleration sensor or together with using the triaxial acceleration sensor, and to determine present use environment. It is certainly possible to use an image received from the camera unit 541 in application software.

Other than the above, it is also possible to record image data of a still image or a moving image in the storage unit 550 by adding information, such as location information acquired by the GPS receiving unit 570, voice information acquired by the microphone 532 (text information acquired by performing speech-to-text conversion with a main control unit and the like is available), and posture information acquired by the motion sensor unit 580, and to output the image data through the external input-output unit 560 and the wireless communication unit 510.

The presently disclosed subject matter is not limited to the embodiments described in the present specification and the embodiments illustrated in the drawings, but may include various design changes and modifications within a range without departing from the essence of the presently disclosed subject matter as a matter of course.

What is claimed is:

1. An image display device comprising:
   an image file acquisition unit configured to acquire an image file including an image created by a photography device and tag information added to the image by the photography device;
   a transmissive display panel configured to display the image of the image file acquired by the image file acquisition unit;
   a backlight unit that is provided on a back face of the transmissive display panel and is divided into a plurality of light emission areas, the backlight unit configured to perform backlight local dimming to determine backlight luminance with respect to the transmissive display panel for each of the divided light emission areas;
   a tag information analysis unit configured to analyze the tag information of the image file acquired by the image file acquisition unit; and
   a control unit configured to determine whether or not to perform the backlight local dimming of the backlight unit in accordance with an analysis result of the tag information of the image file acquired by the tag information analysis unit, detect luminance for each of divided image areas corresponding to the light emission area of the image of the image file to set the backlight luminance for each of the divided light emission areas of the backlight unit in accordance with the detected luminance for each of the image areas in a case where it is determined to perform the backlight local dimming, and control backlight luminance so that the backlight luminance of all the image in the image file becomes uniform in a case where it is determined not to perform the backlight local dimming,
   wherein the tag information analysis unit determines whether or not there is control information showing whether to perform the backlight local dimming of the backlight unit or not in the tag information of the image file acquired by the image file acquisition unit and information on a photographing mode selected by the photography device at a time of photographing the image from the tag information, and
   the control unit detects luminance for each of the image areas of the image of the image file to perform the backlight local dimming in a case where there is the control information on the backlight local dimming in the tag information of the image file and the control information shows that the backlight local dimming is to be performed, and controls backlight luminance so that the backlight luminance of all the image in the image file becomes uniform in a case where there is the control information on the backlight local dimming in the tag information of the image file and the control information shows that the backlight local dimming is not to be performed, and
   the control unit performs control of determining whether or not to perform the backlight local dimming in accordance with the information on the photographing mode, extracted by the tag information analysis unit in a case where there is not the control information on the backlight local dimming in the tag information of the image file.

2. The image display device according to claim 1,
   wherein the image of the image file is a wide dynamic range image composed of a first photographed image and a second image photographed with lower sensitivity or lower exposure with respect to the first photographed image,
   the photographing mode information is dynamic range extension information showing a degree of dynamic range extension of the image or whether or not the image is the wide dynamic range image, and
   the control unit determines whether or not to perform the backlight local dimming in accordance with the dynamic range extension information.

3. The image display device according to claim 1,
   wherein the photographing mode information includes scene position information showing a photographing scene selected by the photography device or exposure control at a time of photographing, and
   the control unit determines whether or not to perform the backlight local dimming in accordance with the scene position information.

4. An image display system including the image display device and the photography device according to claim 1.

5. The photography device constituting the image display system according to claim 4, the photography device comprising:
   an operation unit configured to receive input of a photographing instruction;
   a photographing unit configured to photograph a subject to create the image upon receiving the photographing instruction; and
   a recording unit configured to determine whether or not to perform the backlight local dimming of the backlight unit in accordance with photographing conditions at the time of photographing the subject to create control information showing whether to perform the backlight local dimming, and add the tag information including the control information to the image to record the image file including the image and the tag information on a recording medium.

6. An image display device comprising:
   an image file acquisition unit configured to acquire an image file including an image created by a photography device and tag information added to the image by the photography device;
   a transmissive display panel configured to display the image of the image file acquired by the image file acquisition unit;
   a backlight unit that is provided on a back face of the transmissive display panel and is divided into a plurality of light emission areas, the backlight unit configured to perform backlight local dimming to determine backlight luminance with respect to the transmissive display panel for each of the divided light emission areas;
   a tag information analysis unit configured to analyze the tag information of the image file acquired by the image file acquisition unit; and a control unit configured to determine whether or not to perform the backlight local dimming of the backlight unit in accordance with an analysis result of the tag information of the image file acquired by the tag information analysis unit, detect luminance for each of divided image areas corresponding to the light emission area of the image of the image file to set the backlight luminance for each of the divided light emission areas of the backlight unit in accordance with the detected luminance for each of the image areas in a case where it is determined to perform the backlight local dimming, and control backlight luminance so that the backlight luminance of all the image in the image file becomes uniform in a case where it is determined not to perform the backlight local dimming, wherein the tag information analysis unit extracts information on a photographing mode selected by the photography device at a time of photographing the image from the tag information of the image file acquired by the image file acquisition unit, and the control unit switches whether or not to perform the backlight local dimming in accordance with the information on the photographing mode, extracted by the tag information analysis unit.

7. An image display device comprising:

an image file acquisition unit configured to acquire an image file including an image created by a photography device and tag information added to the image by the photography device;

a transmissive display panel configured to display the image of the image file acquired by the image file acquisition unit;

a backlight unit that is provided on a back face of the transmissive display panel and is divided into a plurality of light emission areas, the backlight unit configured to perform backlight local dimming to determine backlight luminance with respect to the transmissive display panel for each of the divided light emission areas;

a tag information analysis unit configured to analyze the tag information of the image file acquired by the image file acquisition unit; and a control unit configured to determine whether or not to perform the backlight local dimming of the backlight unit in accordance with an analysis result of the tag information of the image file acquired by the tag information analysis unit, detect luminance for each of divided image areas corresponding to the light emission area of the image of the image file to set the backlight luminance for each of the divided light emission areas of the backlight unit in accordance with the detected luminance for each of the image areas in a case where it is determined to perform the backlight local dimming, and control backlight luminance so that the backlight luminance of all the image in the image file becomes uniform in a case where it is determined not to perform the backlight local dimming, wherein the tag information analysis unit extracts information showing an average of backlight luminance in a whole light emission area of the backlight unit at a time of performing the backlight local dimming, from the tag information in the image file, and the control unit controls average luminance in the whole light emission area of the backlight unit in accordance with the information showing the average of backlight luminance, extracted by the tag information analysis unit.

8. The image display device according to claim 7, wherein the control unit controls average luminance in the whole light emission area of the backlight unit in accordance with information on a photographing mode selected by the photography device at the time of photographing in a case where there is no information showing the average of the backlight luminance in the tag information in the image file.

9. The image display device according to claim 7, wherein the tag information analysis unit extracts information showing a degree of contrast extension at a time of performing the backlight local dimming from the tag information in the image file, and the control unit controls a difference between a maximum backlight luminance and a minimum backlight luminance of the backlight unit in accordance with the information showing the degree of contrast extension, extracted from the tag information in the image file.

10. The image display device according to claim 9, wherein the control unit controls the difference between the maximum backlight luminance and the minimum backlight luminance of the backlight unit in accordance with information on the photographing mode selected by the photography device at the time of photographing in a case where there is no information showing the degree of contrast extension in the tag information in the image file.

11. An image display method performed by using image file acquisition unit configured to acquire an image file including an image created by a photography device and tag information added to the image by the photography device, a transmissive display panel configured to display the image of the image file acquired by the image file acquisition unit, and a backlight unit that is provided on a back face of the transmissive display panel and is divided into a plurality of light emission areas, the backlight unit configured to perform backlight local dimming to determine backlight luminance with respect to the transmissive display panel for each of the divided light emission areas, the image display method comprising:

a tag information analyzing step of analyzing the tag information of the image file acquired by the image file acquisition unit;

a step of determining whether or not to perform the backlight local dimming of the backlight unit, in accordance with an analysis result of the tag information of the image file;

a step of detecting luminance for each of divided image areas corresponding to the light emission area of the image of the image file in a case where it is determined to perform the backlight local dimming;

a step of determining the backlight luminance for each of the divided light emission areas of the backlight unit in accordance with the detected luminance for each of the image areas in a case where it is determined to perform the backlight local dimming; and a step of making the backlight luminance uniform in all the image in the image file in a case where it is determined not to perform the backlight local dimming, wherein the tag information analyzing step includes extracting information on a photographing mode selected by the photography device at a time of photographing the image from the tag information of the image file acquired by the image file acquisition unit, and the method further including switching whether or not to perform the backlight local dimming in accordance with the information on the photographing mode, extracted in the tag information analyzing step.

* * * * *